Sept. 20, 1927. 1,642,723
H. DE WALLACE
MORTISING MACHINE
Filed Sept. 13, 1926   2 Sheets-Sheet 2
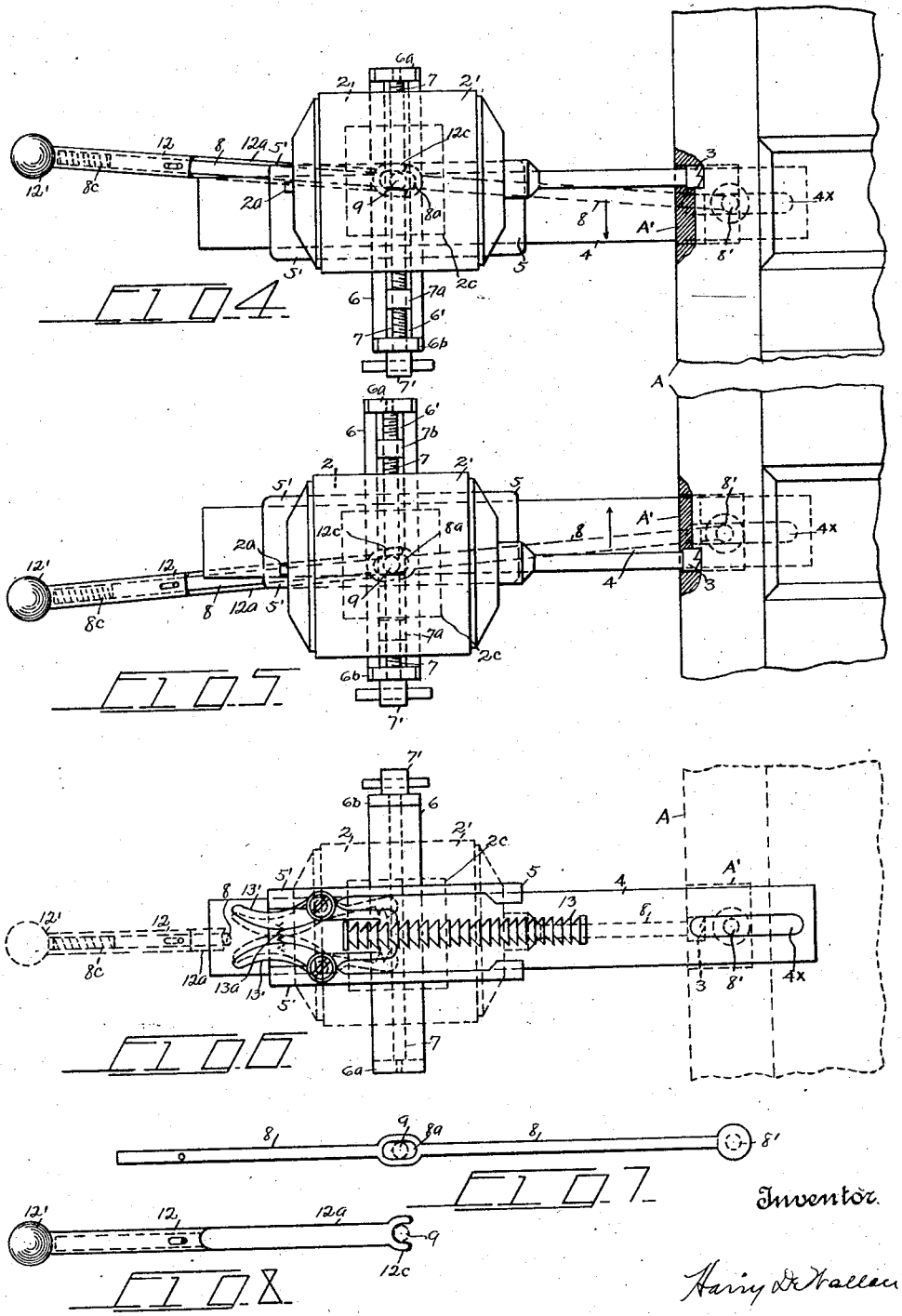

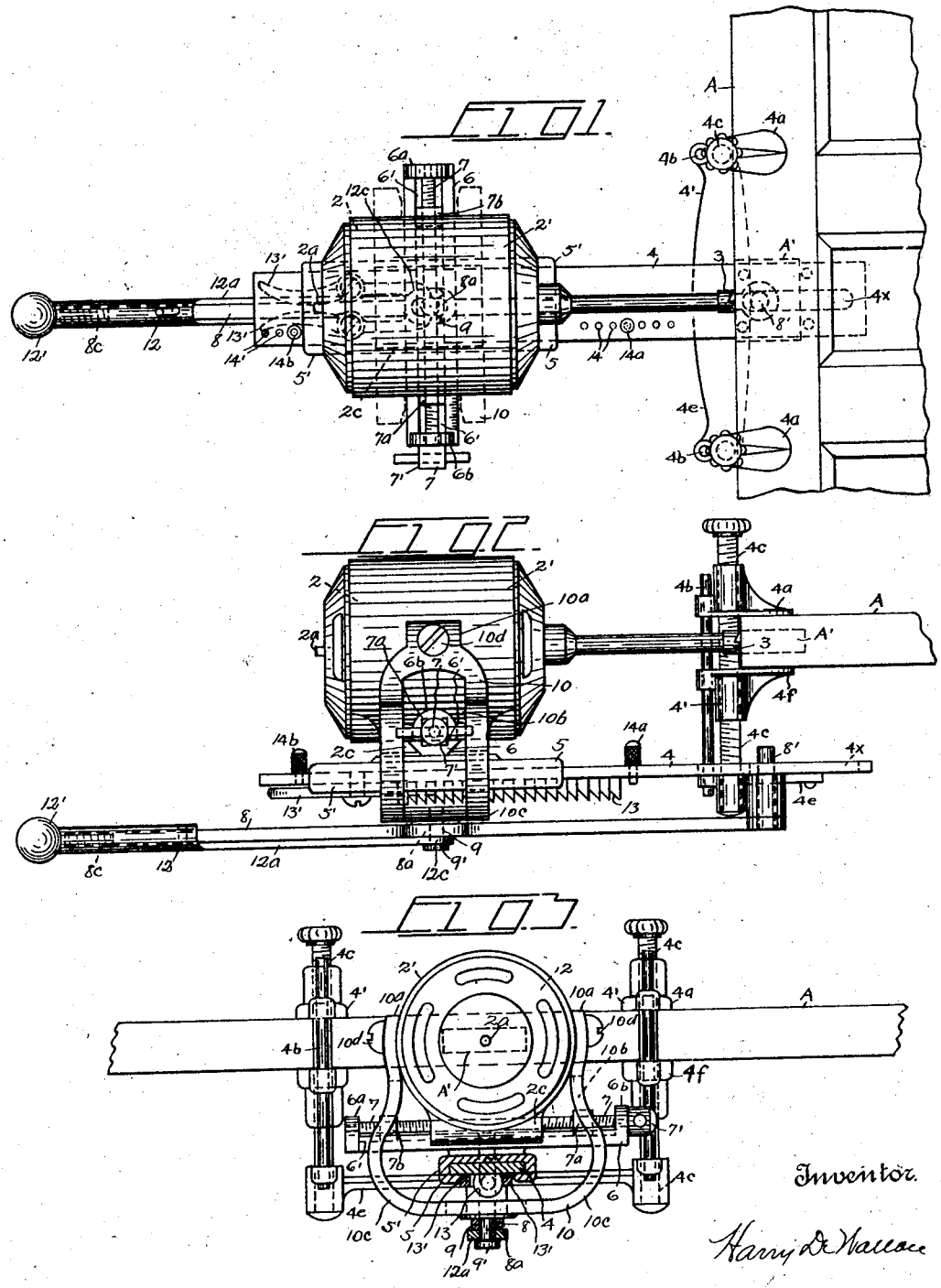

Patented Sept. 20, 1927.

1,642,723

UNITED STATES PATENT OFFICE.

HARRY DE WALLACE, OF SYRACUSE, NEW YORK, ASSIGNOR TO RAY L. CARTER, OF PHOENIX, NEW YORK.

MORTISING MACHINE.

Application filed September 13, 1926. Serial No. 135,138.

This invention relates to portable mortising machines and has particular reference to means for preparing doors for the reception of the well known mortise locks.

The object of the present invention is to provide a hand-controlled power driven mortising and routing machine in which the tool is operated by an electric motor, the motor and tool being movable bodily towards as well as at right angles to the work by hand-controlled means, for sinking square and rectangular mortises. A further object is to provide a bracket for supporting the mortising mechanism, the bracket being adjustable and adapted to be clamped to an edge of a door, or other part. A further object is to provide means for slidably supporting the motor upon a member of the bracket, the said means supporting a guide member, by which the motor is movable in planes which enable the mortising tool to effect cuts parallel to the edge of the door. A further object is to provide manually controlled means for moving the motor and tool towards the door by measured steps, for progressively sinking the mortises, and for preventing the recoil or backward movement of the motor and tool during the mortising operations. A further object is to provide simple means for enabling the motor and tool to be moved away from the door at the end of the mortising operations. And a further object is provide means for accurately gaging the cutting range of the tool, for varying the height as well as the length of the mortise.

I attain these objects by the means set forth in the detailed description which follows, and as illustrated by the accompanying drawing, in which—

Figure 1 is a front side elevation of the complete machine mounted upon a door or like part, in readiness to start the mortising work. Fig. 2 is a bottom side view of the same. Fig. 3 is a rear end elevation of the machine. Fig. 4 is a front side view showing the motor and tool advanced to effect a downward cutting stroke. Fig. 5 is a similar view showing the motor and tool in the act of effecting an upward cutting stroke. Fig. 6 is a bottom face view of the guide-bar, the shoe and the dovetail guide; showing the jogging parts. Fig. 7 is a view of the operating lever. And Fig. 8 is a view of the sleeve and the jogging fork carried by the lever.

In the drawings, 2 represents an ordinary electric motor, 2′ the outer casing thereof, and $2^a$ is the armature shaft, which supports and drives the mortising or boring tool 3. The motor and related parts are adjustably supported by a relatively long arm 4 of a bracket 4′, the latter comprising adjustable clamping members $4^a$—$4^f$ arranged in pairs, and which are adapted to grip the opposite faces of a door, or other part, as A, at the opposite sides of a mortise or other work, as A′. The clamping members of each pair are movable towards and from each other, by means of screws $4^c$, and said members are guided and partially supported by rods $4^b$. The clamps $4^a$—$4^f$ are tied together by a web $4^e$, to which the guide-bar is made rigid. The motor 2 is movably mounted upon a shoe 5, whose opposite edges 5′ slidably grip the bar 4, the shoe being arranged to be moved forwardly step by step during the mortising operations, carrying the motor with it. Upon the one face of the shoe 5 is transversely and rigidly mounted a dovetail guide 6, which is engaged by a correspondingly grooved or slotted leg or part $2^c$ of the motor casing, by means of which the motor and tool may be moved in planes parallel to one edge of the door A, for sinking the mortises. The outer face of the guide 6 is formed with a longitudinal groove 6′, and the ends of the guide are provided with upturned perforated lugs $6^a$—$6^b$, in which is journaled a screw 7, the latter having an operating head 7′, by which the screw is rotated. The screw 7 is provided with right and left hand threads, and said threads engage similar angular nuts $7^a$—$7^b$, which are disposed near the opposite ends and in the path of the guide-lug $2^c$, the nuts slidably engaging the groove 6'. The turning of the screw 7 in opposite directions moves the nuts 7ª—7ᵇ towards and away from each other, for gaging the movements of the motor along the guide 6, and by means of which the height of the mortise A' may be accurately determined. The outer face of the guide 6 is also provided with a scale (see Fig. 1) for predetermining the height of the mortises. In Fig. 1, one edge of the nut 7ª is in registry with one of the longer graduations of the scale, which may denote that the mortise to be cut by the tool 3, is say, 4 inches in height. Mortises of any suitable height within a certain range may be cut, by simply adjusting the gage-nuts 7ª—7ᵇ, as explained.

The motor 2 is preferably moved along the guide 6 manually, by means of a lever 8, one end of which is pivoted by a pin 8' in a slot 4ˣ of the bar 4. The medial portion of lever 8 is enlarged, and formed with a longitudinal slot 8ª, which loosely engages a pin 9, the latter being rigid to the medial bottom portion of a yoke 10, the said yoke having its arms 10ª made fast to the opposite sides of the motor casing by screws 10ᵈ (see Figs. 2 and 3). The arms 10ª of the yoke are provided with similar openings 10ᵇ, through which the guide 6 plays. The yoke is preferably expanded opposite the lateral edges of the arm 4, as at 10ᶜ, for providing suitable clearance when the motor is moved in opposite directions on the guide 6. By this provision, the motor may be raised and lowered for cutting relatively high mortises without interference by the guide 4 or the yoke 10. The pin 9 projects beyond the yoke and is preferably formed with a head 9', for preventing accidental detachment of the lever and related parts. The lever 8 telescopes a sleeve 12, whose free end is formed with a knob 12', and within this sleeve is disposed a spring 8ᶜ, which serves to cushion the parts and preferably holds the sleeve extended. Beyond the sleeve an integral arm 12ª extends toward the motor and its free end is formed with a fork 12ᶜ, which straddles the pin 9. The raising and depressing of the lever 8 on the pivot 8', bodily raises and lowers the motor and tool for effecting vertical cuts in the door A, as best seen in Figs. 4 and 5. By this means, the inner end of the mortise is cut parallel to the edge of the door and corresponds exactly to the usual angular dimensions of mortise locks. When the operator completes each cutting stroke, he pushes sleeve 12 inwardly against the tension of spring 8ᶜ, and the fork 12ᶜ forces the motor and tool forwardly a measured distance for positioning the tool, for effecting the next cut, and so on. The said jogging of the motor and tool is regulated, and the motor is held from recoil or backward movement, by means of a rack 13 of relatively coarse pitch, which is mounted rigidly on the bottom or rear face of the guide 4, and by a pair of dogs 13', which are pivoted to the shoe 5, and have toothed jaws that engage the opposite sides of the rack, the dogs preferably being held against the rack by a spring, as 13ª (see Fig. 6). The forward jogging of the motor and tool may be regulated by any suitable means. A convenient practice is to advance the motor following each cutting a distance equal to the spacing of adjacent teeth of the rack 13. The free or outer ends of the dogs may be moved toward each other for spreading the jaws, in a well known manner, for enabling the motor and tool to be withdrawn from the mortise A''. The arm 4 is provided with perforations 14 and 14', which are engaged by stop-pins 14ª—14ᵇ, for limiting the movements of the motor along the guide 4. Stop 14ª preferably regulates the depth to which a mortise may be cut, while the stop 14ᵇ prevents the accidental release of the shoe and related parts from the free end of the guide 4. When both of these stops are adjusted in the proper directions they lengthen or shorten the travel of the motor and tool along the guide 4, for cutting deep or shallow mortises. By providing the slot 4ˣ, in the guide 4, for enabling the lever 8 to advance with the motor, the upward and downward strokes of the lever and tool are of the same length. This insures the cutting of the top and bottom margins of all mortises substantially parallel to each other. The motor 2 is preferably positioned midway between the ends of the operating lever 8, and although the motors 2 are never very heavy, this disposition of the parts tends to greatly reduce the actual weight lifted by the operator, and enables him to raise and lower the motor with more steadiness than if the lever were otherwise applied. The use of the sleeve with its yoke 12ᶜ prevents the pin 9 from wearing the slot 8ª and lengthening it. It enables the operator to move the yoke into engagement with the pin without disturbing the lever 8 or initially moving the tool. In this connection, it may be explained that the spring 8ᶜ is preferably of such tension as to move and resiliently hold the sleeve extended, but is not stiff enough to render the sleeve and lever rigid as one part. By using the cushioned sleeve 12, there is no danger of the operator forcing the tool and causing it to choke. In case he feeds the motor forwardly too rapidly, the spring 8ᶜ tends to cushion the tool. This is quite important, especially when the machine is mortising doors made of the harder woods. The downward cutting strokes especially when the tool is relatively of small diameter and also when the door or other work consists of the softer varieties of wood, like pine, red wood, white wood, and the like, may be effected by gravity alone.

Having thus described my invention, what I claim, is—

1. A door mortising machine including a motor and a tool driven thereby, a bracket adapted to be clamped to the edge of a door having a guide arm formed with a slot, a shoe slidable on said guide-arm towards and away from the door, a guide member mounted on said shoe, for enabling the motor to be moved bodily in planes parallel to the edge of the door, a lever pivoted in the slot of the guide-arm for moving the motor along said guide, means carried by said lever for advancing the motor for progressively sinking a mortise in the edge of the door, and means carried by said guide-arm and said shoe for maintaining each advance of the motor.

2. The combination with a motor and a tool driven thereby and a bracket adapted to be clamped to the edge of a door having a guide arm for supporting the motor at a distance from the door, of a shoe slidable on said guide-arm, a transversely disposed guide member carried by said shoe on which the motor is slidable, a lever pivoted to the guide-arm and to a part carried by the motor for moving the motor bodily on said guide member in planes parallel to the edge of the door, means carried by the lever for jogging the motor and said lever towards the door for progressively sinking the mortise, and means for preventing backward movement of the motor during the mortising operation.

3. The combination with an enclosed motor and tool driven thereby, and a bracket adapted to be clamped to an edge of a door having a guide-arm, and a shoe slidable on said guide-arm towards and away from the door, of a guide member mounted transversely on said shoe and engaging a groove in the motor casing, a yoke carried by the motor and straddling said guide-arm, a lever pivoted intermediate its ends to said yoke adapted for moving said motor along said guide member for enabling the tool to cut mortises whose ends as well as its top and bottom edges are parallel, a sleeve telescoping said lever adapted for advancing the motor at the end of each cutting stroke, and means for enabling said lever to effect cutting strokes of the same length throughout the mortising operation.

4. A door mortising machine including a bracket adapted to be clamped to the edge of a door, and having a guide-arm provided with a slot near one end, a shoe slidable on said guide-arm, a guide member mounted transversely on said shoe, an encased motor and a tool driven thereby, said casing having a groove to receive said guide member, a yoke secured to the motor casing and straddling the casing and said shoe, means pivoted in the slot of said guide-arm and also to said yoke for moving the motor in opposite directions on said guide member, for enabling the tool to effect cuts parallel to the edge of the door, means for advancing the motor at the end of each cutting stroke, and means carried by said guide-arm and said shoe, for preventing backward movement of the motor and tool during the mortising operations.

5. A door mortising machine including an encased motor and a tool driven thereby, the casing of the motor having a transverse groove, a yoke straddling the motor having a pin registering with the axis of the motor, a bracket adapted to be clamped to an edge of a door having a guide-arm extending through said yoke and having a slot adjacent the door, a lever having its remote end pivoted in the slot of the guide-arm, and engaging the pin of the yoke adapted to move the motor in planes parallel to the edge of the door and transversely to the guide-arm, means carried by the guide-arm, for moving the motor towards and away from the door, means engaging the groove of the motor casing for guiding the motor in its transverse movements, and means carried by said lever for jogging the motor and said lever towards the door at the end of each cutting stroke by the tool.

6. In a mortising machine, a motor driven tool, means for slidably supporting the motor, means to raise and lower the motor including a lever having pivotal and slidable connection intermediate its ends with the motor, and means to connect one end of the lever to the supporting means so as to permit the lever to have pivotal and bodily slidable movement relative to the supporting means so as to advance with the motor.

7. In a mortising machine, a motor driven tool, means for slidably supporting the motor, means to advance the motor, means having pivotal and slidable connection with the motor to raise and lower the latter, and means to connect the raising and lowering means to the supporting means for pivotal and slidable movement relative thereto so as to enable the raising and lowering means to advance with the motor.

8. In a mortising machine, a motor driven tool, means for slidably supporting the motor, means to raise and lower the motor including a lever slotted intermediate its ends, a projection having rigid connection with the motor received in the lever slot, a spring pressed sleeve slidable on one end of the lever and engageable with said projection to advance the motor, and means to connect the opposite end of the lever to the supporting means for pivotal and sliding movement relative thereto.

9. In a mortising machine, a motor driven tool, means for slidably supporting the motor, means to raise and lower the motor including a lever having pivotal and slidable connection intermediate its ends with the motor, means to connect one end of the lever to the supporting means so as to permit the lever to have pivotal and bodily slidable movement relative to the supporting means so as to advance with the motor, and means slidably carried by the lever for advancing the motor.

In testimony whereof I affix my signature.

HARRY DE WALLACE.